March 29, 1960     R. P. KOEHRING     2,930,521
GAS TURBINE STRUCTURE

Filed Aug. 17, 1955     2 Sheets-Sheet 1

INVENTOR.
Roland P. Koehring
BY
His Attorney

March 29, 1960 — R. P. KOEHRING — 2,930,521
GAS TURBINE STRUCTURE
Filed Aug. 17, 1955 — 2 Sheets-Sheet 2

INVENTOR.
Roland P. Koehring
BY
His Attorney

United States Patent Office 2,930,521
Patented Mar. 29, 1960

2,930,521

GAS TURBINE STRUCTURE

Roland P. Koehring, Dayton, Ohio, assignor to General Motors Corporation, Detroit, Mich., a corporation of Delaware Application August 17, 1955, Serial No. 528,899

3 Claims. (Cl. 230—133)

This invention relates to turbo-compressors and is particularly concerned with self-sealing surfaces used in such compressors in conjunction with the extremities of the rotor vanes.

It is therefore an object of the invention to provide a compressor structure for use in turbo-compressors wherein a surface is provided adjacent the outer edges of rotor vanes which surface is self-seating with respect to the edges of the rotor vanes so that extremely close tolerances may be maintained whereby the compressor will attain maximum efficiency at the elevated temperature of operation.

Another object is to provide a sealing surface around the periphery of each rotor stage of a turbo-compressor wherein a metal is used which is sufficiently soft to permit the rotor blades to seat themselves therein during operation whereby a high degree of accuracy is obtained in the assembly.

In carrying out the above objects it is a further object of the invention to provide a porous nickel surface around the periphery of each of the rotor vane stages which surface is made by sintering non-compacted nickel powder together into a strong porous layer that may be assembled to form the sealing surface, said porous nickel layer being sufficiently soft to be readily cut by the outer edges of the rotor blades during operation so that the blades seat themselves against the surface at the desired temperature of operation.

Further objects and advantages of the present invention will be apparent from the following description, reference being had to the accompanying drawings, wherein preferred forms of the invention are clearly shown.

In the manufacture of compressors for use in gas turbines, the efficiency of the compressor is dependent on the dimensional tolerances maintained during its manufacture. These tolerances in most instances cannot be maintained very close due to the fact that the compressor becomes heated unevenly to elevated temperatures during operation due to its proximity to the burners of the turbine and thus unequal expansion of the several parts of the compressor is experienced. The tolerances necessary to use in the average turbo-compressor, therefore, are not sufficiently close to obtain maximum efficiency of the compressor due to leakage around the compressor rotor blades and the adjacent surfaces. One of the most difficult positions to maintain under close tolerance is the peripheral seal between the ends of the compressor rotor blades and the housing therefor and this condition has been apparent for some time without a satisfactory solution.

The present invention is directed to remedying this condition by supplying a surface adjacent the ends of the compressor blades which may be machined to close tolerance therewith while the blades and the remainder of the compressor are cold and which upon heating of the several parts is sufficiently soft or abradable to permit the blades to seat themselves therein by actually cutting away portions of the surface whereby an accurately dimensioned sealing surface is obtained at the temperature of operation.

This solution is directed to the use of a metal sealing surface in conjunction with the compressor blades which has sufficient refractory qualities to remain unaffected at the elevated temperatures of operation and which is sufficiently machinable to permit the outer edges of the blades to cut portions thereof away during the self-seating operation at elevated temperatures. Such a surface may be formed from porous nickel wherein the surface is formed by sintering together substantially loose non-compacted metal powder, predominantly nickel, which may be bonded directly to the surface of the housing or which may be fabricated in composite form wherein the porous nickel is bonded directly to a steel strip which may be used as an insert within the housing, the details of the process for forming such material will be described hereinafter.

Figure 1:
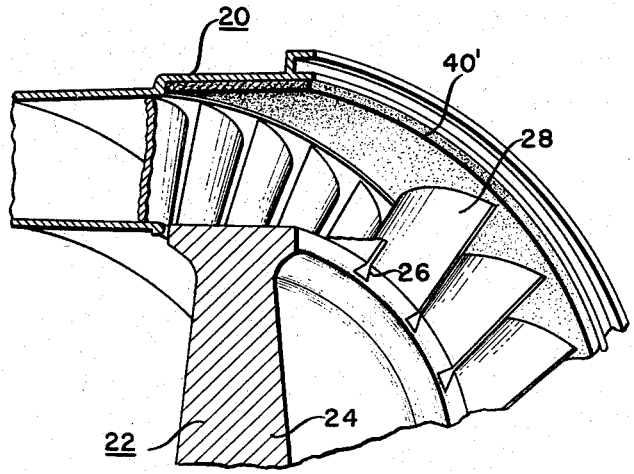
Figure 1 is a fragmentary view partially in section of one rotor stage with a portion of the rotor vanes being cut away to show the adjacent stator vanes.
Figure 2:
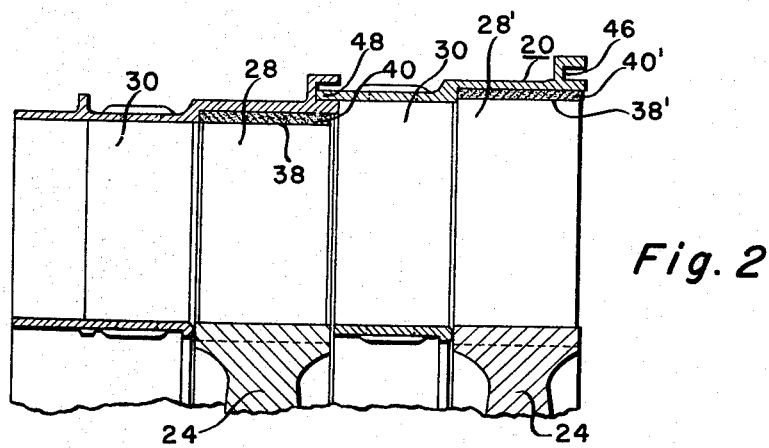
Figure 2 is a fragmentary view in section of two stages of rotor vanes in a conventional compressor.

Referring specifically to the drawings, Figure 1 shows a fragmentary sectional view in perspective of a compressor showing one rotor stage at 22 wherein 24 comprises the rotor per se which has a plurality of wedge-shaped slots 26 positioned around the outer periphery thereof which slots are preferably at an angle to the axis of the rotor. Within these slots are locked a plurality of vanes 28 which have complementary root or foot portions of interlocking shape driven into the slots 26 for holding the vanes in spaced and accurate position with respect to the rotor. Such structures form no part of this invention and are well known in the art. On opposite sides of the rotor, a plurality of stator vanes are provided as shown in Figure 2 at 30. The stator vanes may be attached directly to the housing 20 or may be removably keyed therein in a manner similar to the manner used for positioning the rotor vanes. These stator vanes are dimensioned so as to be laterally positioned very close to the edges of the rotor vanes as noted in Figure 2.

Figure 3:
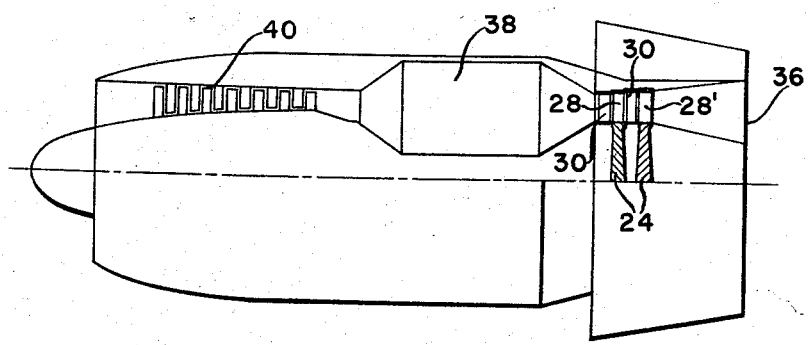
Figure 3 is a diagrammatic view partly cut away showing a gas turbine and specifically illustrating the compressor portion thereof with its relation to the turbine portion.

As is the usual practice each stage of the compressor is smaller in diameter so that air being drawn in from the inlet shown at 36 in Figure 3 is compressed as it is driven through the compressor due to the pitch of the blades thereof and progressive reduction in diameter of successive stages whereupon it emerges in highly compressed condition into a burner section 38, the effluent of which drives the turbine 40.

It will be seen from Figure 2, for example, that the outer edges 38 and 38' of compressor stages 28 and 28' must be in close proximity to the inner peripheries 40 and 40' of the housing 20 in order to obtain maximum efficiency within the compressor. Due to the heat of combustion within the turbine, the housing 20 becomes hot and expands at a rate of differential expansion over that noticed in the blades and therefore even though the dimensions of the blades and housing are quite close when cold or at room temperature, these same dimensions vary more widely as the difference in temperature between the several parts is expanded. If the tolerances are too close it has been found that as the housing 20 becomes heated, the tolerance decreases and the outer edges of the blades scrape the housing injuring the blades and sometimes rendering the entire compressor inoperative.

In order to overcome these problems I have devised a compressor assembly wherein the inner peripheral surface of each stage, as denoted at 40 and 40', for example, is a relatively soft and highly refractory metal surface which when it is contacted by the outer edges of blades 28 and 28' is sheared off, cut away or burnished by the blades to form a highly accurately dimensioned sealing surface therewith. In subsequent operation of the turbo-compressor, these tolerances are maintained as is the sealing function thereof.

In practice the several stages of the housing may be interlocked together by means of annular grooves 46 at one end thereof which fit over the opposite straight end 48 of the next section. This entire group of interlocking rings form the housing and are clamped together in suitable fashion. The nickel powder is sintered directly to the housing walls by use of suitable molds such as graphite or oxidized chrome steel molds which are positioned in concentric arrangement with the housing section prior to the pouring of the powder therebetween. This assembly is then heated to a suitable sintering temperature under the proper atmospheric conditions to cause the nickel powder to sinter together and simultaneously bond in situ to the surface of the housing. The porous nickel lining may subsequently be compressed and annealed if desired to obtain a desired degree of porosity.

In some cases the housing 20 may be formed of a plurality of segments wherein the metal powder is distributed in an even layer thereover and sintered. Thereafter the several segments may be suitably assembled into a ring-like structure.

Figure 4:
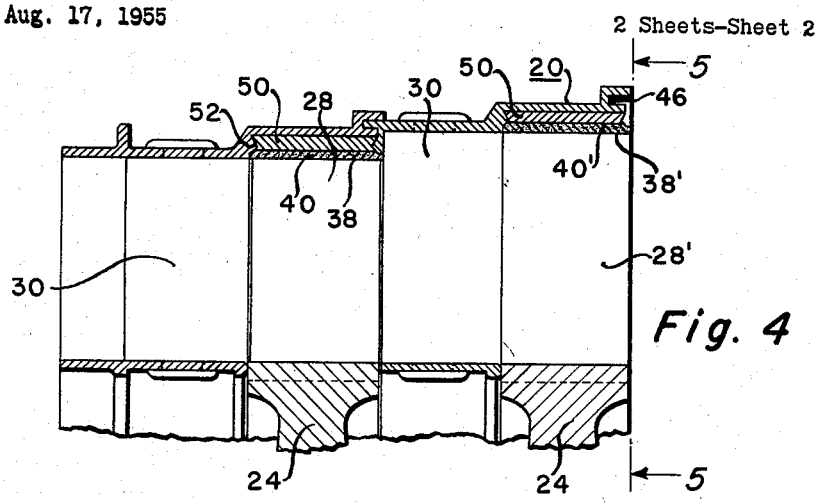
Figure 4 is a view of another embodiment of the invention shown in Figure 2.
Figure 5:
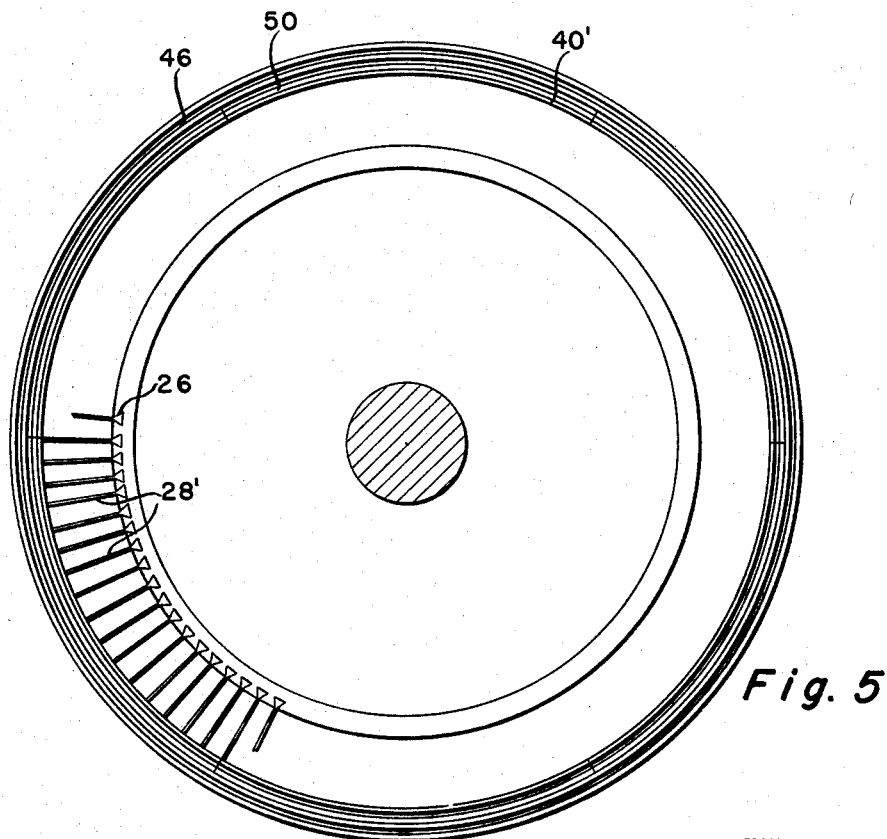
Figure 5 is a section taken on line 5—5 of Figure 4.

A modification of this structure is shown in Figure 4 wherein the nickel powder is sintered directly onto flat strips of steel or stainless steel 50 wherein a plurality of segments are used which are subsequently built up and fitted within the housing to form the complete sealing surface. This last expedient is particularly desirable since it makes the sealing surfaces replaceable without scrapping the housing per se. The steel backing strips may be dovetailed as noted at 52 into the housing to hold them in proper aligned position.

In the manufacture of the porous nickel layer I propose to use 80 to 200 mesh nickel powder which is spread in a substantially non-compacted layer upon a strip which has preferably been flash copper plated. This assembly, having a desired depth of nickel powder thereon, is heated to about 2000° F. for a period of from 20 to 60 minutes in a non-oxidizing or reducing atmosphere such as hydrogen. At the end of the sintering it will be found that the nickel powder is bonded together into a porous network which is likewise bonded to the steel by a strong bond. This porous layer may be subsequently compressed as desired to reduce its porosity and may be annealed under proper atmospheric conditions as above outlined at temperatures in the order of 1500° F. to 2000° F. for a short period to remove strains. In all cases, however, the porosity should be sufficient in the finished product so that the blade can easily cut a path in the relatively soft material without distorting or otherwise injuring the blade. The desired amount of porosity is best arrived at by trial with respect to the particle size of the powder used as a starting product.

It should be pointed out that the tolerances involved in a turbo-compressor are quite critical and changes in dimension in the order of .001 to .005 of an inch in diameter of the rotor housing makes tremendous difference in the efficiency thereof. In other words, self-seating of the blade against the sealing surface is accomplished with very little cutting away of the nickel layer, but this slight amount of cutting away is essential to the close tolerance required in the finished product.

While metals other than nickel may be used, I have found that nickel is the most suitable since it forms a reasonably soft metal layer with respect to the ability of the blade to cut therein while simultaneously exhibiting high heat resistant qualities which make it most desirable for the intended use. Chromium, chromium-nickel mixtures, iron-nickel mixtures, etc., can be used for this purpose but are more difficult to prepare and in the case of the iron mixtures are not as resistant to heat and not as resistant to wear against the ends of the blades which are normally stainless steel or other highly heat resistant materials that are quite hard.

In place of a copper plate on the backing, an immersion nickel deposit is most useful. The deposit may be used on the steel or stainless steel backing member 50 and also may be used to pre-coat the particles of nickel powder. This deposit enhances the bond as it contains phosphorus up to 11.4% since the deposit is made from a solution which deposits nickel phosphide. Immersion coatings of this nature are well known and satisfactory procedures are disclosed in many periodicals, for example in the July 1950 issue of "Plating" in an article by W. A. Wesley entitled "Nickel Immerison Coatings." Such a deposited layer improves the strength of the porous nickel layer and also improves the strength of the bond between the porous nickel layer and the backing or support 50. The nickel phosphide reaches a liquidus temperature well below the melting point of nickel and thus bonds the several materials together with a strong bond at temperatures in the order of 1700° F.

It is also manifest that the sintering temperatures noted are not of a limiting nature since sintering temperatures of a lower order will provide a satisfactory surface as the sintering period extends to about an hour. Furthermore when lower temperatures are used it is more desirable to use reduced size powder, for example, at the low end of the 80 to 200 mesh range whereas at higher sintering temperatures a wider range of particle size can be used with satisfaction. While hydrogen sintering atmospheres are the most useful, any of the non-oxidizing sintering atmospheres well known in the art may be used such as dehydrated incompletely burned natural gas, carbon monoxide, mixtures of any of the above. However, I have found that a hydrogen atmosphere results in a more uniform product with less control of related conditions and therefore I prefer to use such an atmosphere. The same is true with respect to the size of the metal powder and the sintering temperature, which, while all of these factors may be varied within wide limits, the preferred embodiment of 80 to 200 mesh powder sintered for approximately 50 minutes at 2000° F. in hydrogen provides a more uniform product.

A full disclosure for sintering substantially loose non-compacted metal powders to steel is set forth in my Patents Nos. 2,198,263 and 2,198,254.

While the forms of embodiment of the invention as herein disclosed constitute preferred forms, it is to be understood that other forms might be adopted, as may come within the scope of the claims which follow.

What is claimed is as follows:

1. An assembly adapted for use in turbo-compressors and the like for operation at elevated temperatures, comprising in combination; a casing, a rotor wheel journalled for rotation in said casing and including a plurality of radially extending blades which have a predetermined clearance between the ends thereof and the inner portion of the casing member when the assembly is at room temperature, said inner portion of the casing member having a peripheral sealing surface facing inwardly from the casing and formed from a refractory and readily abradable metal consisting essentially of a sintered layer of substantially noncompacted nickel powder, said layer having sufficient thickness to initially cause interference between the layer and the ends of the blades when the compressor attains its operating temperature whereby the ends of the blades cut away an annular portion of said layer coextensive with the ends of the blades as the assembly reaches its operating temperature to provide a minimum operating clearance between the ends of the blades and the layer.

2. An assembly adapted for use in a turbo-compressor and the like for operation at elevated temperatures, comprising in combination; a casing member, a removable track extending around the inner periphery of said casing member, a rotor wheel journalled for rotation within the casing member and track and including a plurality of radially extending blades therearound having a predetermined clearance between the ends thereof and the track when the assembly is at room temperature, and a refractory and readily abradable metal wear surface coextensively bonded to the track and facing inwardly thereof and consisting essentially of a sintered layer of substantially noncompacted nickel powder, said layer having sufficient thickness to cause initial interference between the layer and the ends of the blades when the compressor first attains its operating temperature whereby the ends of the rotor blades cut away an annular surface portion of the layer coextensive with the ends of the blades as the assembly reaches an operating temperature to provide a minimum operating clearance between the ends of the blades and the wear surface.

3. An assembly adapted for use in turbo-compressors for operation at elevated temperatures, comprising in combination; a casing member, a stainless steel track removably positioned within the casing member, a rotor wheel journalled for rotation within the track and including a plurality of radially extending blades and a refractory, readily abradable wear surface integrally bonded to and facing inwardly from the track and consisting essentially of a sintered layer of substantially noncompacted metal powder, said layer having sufficient thickness to cause initial interference between the layer and the ends of the rotor blades when the assembly first attains its operating temperature whereby the ends of the rotor blades cut away an annular surface portion of said layer coextensive with the ends of the blades for providing minimum operating clearance therebetween.

References Cited in the file of this patent

UNITED STATES PATENTS

| | | |
|---|---|---|
| 941,395 | Westinghouse | Nov. 30, 1909 |
| 1,033,237 | De Ferranti | July 23, 1912 |
| 2,064,086 | Short et al. | Dec. 15, 1936 |
| 2,227,307 | Hildabolt | Dec. 31, 1940 |
| 2,372,203 | Hensel et al. | Mar. 27, 1945 |
| 2,680,410 | Kolb | June 8, 1954 |
| 2,720,356 | Erwin | Oct. 11, 1955 |
| 2,725,265 | Daniels et al. | Nov. 29, 1955 |
| 2,742,224 | Burhans | Apr. 17, 1956 |
| 2,754,050 | Wellington | July 10, 1956 |

FOREIGN PATENTS

| | | |
|---|---|---|
| 733,918 | Great Britain | July 20, 1955 |
| 975,879 | France | Oct. 17, 1950 |
| 1,068,395 | France | Feb. 3, 1954 |